`United States Patent` [19]

Burel et al.

[11] Patent Number: 5,428,085
[45] Date of Patent: Jun. 27, 1995

[54] BITUMEN-POLYMER COMPOSITIONS, THEIR METHOD OF PREPARATION AND THEIR USES

[75] Inventors: Pierre Burel; Yannick Jolivet; Guy Lemoine, all of Le Havre, France

[73] Assignee: Total Raffinage Distribution SA, Levallois-Perret, France

[21] Appl. No.: 166,642

[22] Filed: Dec. 14, 1993

[30] Foreign Application Priority Data

Dec. 14, 1992 [FR] France ................................ 92 15016

[51] Int. Cl.$^6$ .............................................. C08L 95/00
[52] U.S. Cl. ........................................ 524/59; 524/68; 524/69; 524/70; 524/71
[58] Field of Search ...................... 524/59, 68, 69, 70, 524/71

[56] References Cited

U.S. PATENT DOCUMENTS

| | | | |
|---|---|---|---|
| 5,068,270 | 11/1991 | Isobe et al. | 524/68 |
| 5,130,354 | 7/1992 | Gelles | 524/68 |
| 5,137,947 | 8/1992 | Isobe et al. | 524/68 |

FOREIGN PATENT DOCUMENTS

| | | |
|---|---|---|
| 0351736 | 1/1990 | European Pat. Off. . |
| 0384254 | 8/1990 | European Pat. Off. . |
| WO-9118032 | 11/1991 | WIPO . |

*Primary Examiner*—Peter A. Szekely
*Attorney, Agent, or Firm*—A. Thomas S. Safford

[57] ABSTRACT

This bitumen-polymer composition contains:
  a) at least one bitumen,
  b) at least one polymer having hydrocarbon chains with mobile hydrogens, said polymer being grafted and crosslinked in situ in said bitumen through a complex of at least one organic silicon compound, said complex being formed from a primary constituent and a secondary constituent, the latter being the organic silicon compound.

48 Claims, No Drawings

BITUMEN-POLYMER COMPOSITIONS, THEIR METHOD OF PREPARATION AND THEIR USES

RELATED APPLICATIONS

This application claims priority from French Application Serial No. 92 15016 filed Dec. 14, 1992, incorporated herein by reference. Reference is also made to commonly owned, concurrently filed application, "Aqueous Bitumen-Polymer Emulsions, Their Method of Preparation and Their Uses" Ser. No. 08/166,641 (Attorney Docket No. 120301-2361 (124676)) which claims priority from French application Serial No. 92 15017 filed Dec. 14, 1992; both of which are also incorporated by reference.

FIELD OF THE INVENTION

The present invention relates to bitumen-polymer compositions, their preparation and their uses, particularly for making bituminous coatings with improved physical properties.

BACKGROUND OF THE INVENTION

It is known that bitumen can be produced, in particular, from crude petroleum by distillation and deasphalting of the heavy fraction obtained by such distillation or distillations. Depending on the origin of the crude, bitumen consists of varying proportions of paraffinic oil (aliphatic or naphthenic), aromatic oil, resins and asphaltenes (on this subject, attention is directed to European Patent [EP] 246 956 and its U.S. equivalent, U.S. Pat. No. 4,810,367, both of which are owned by Applicants' assignee and are incorporated herein by reference).

Depending on its composition, bitumen can have a more or less thermoplastic character. It softens on heating, and its softening point, commonly referred to as its "ring-and-ball" temperature after the method of determination used (AFNOR[1] method NFT 66008), can vary from about 30 to about 130 ° C.,

[1] Association Francaise de Normalisation=French Association for Standardization depending on the process by which the bitumen was obtained.

These temperatures may be insufficient for certain uses because of:

— risk of high temperature flow when used as sealing coatings;
— inadequate elastic behavior; and
— inadequate heat resistance; for instance, in certain cements used for certain applications (automobile chassis).

Among the techniques for improving the heat resistance of bitumen are, in particular, the following.

1. Oxidation of bitumen by the air-blowing method at about 250 ° C. However, the product thus obtained has disadvantages such as a high "ring-and-ball" temperature and is harder and more brittle.

2. Modification of bitumen by incorporation of certain polymers, which affords products with a "ring-and-ball" temperature as high as 120°–150 ° C. However, these products have disadvantages such as that at a temperature of 150 ° C., such products are only slightly elastic.

3. Modification of bitumen by incorporation of a polymer such as SBR (styrene-butadiene rubber) or SBS (styrene-butadiene-styrene) which can be vulcanized with sulfur (or a sulfur donor) or a peroxide. However, this modification has disadvantages. It requires elevated and accurately controlled temperatures over a relatively long period of time. Further, the product thus obtained has a very high viscosity and is not readily compatible with application methods used by the industry. Also, vulcanization imparts to it an irreversible character which is not conducive to easy use. The product must be used within weeks after its production because its viscosity must remain compatible with that with which it will be used.

In the course of their research studies, Applicants have developed bitumen-polymer blends which avoid the various disadvantages and drawbacks presented by the products obtained by and of the methods heretofore described above.

OBJECTS AND SUMMARY OF THE INVENTION

A purpose of the present invention is therefore to provide bituminous products which possess good heat resistance and at the same time retain a viscosity that is compatible with application techniques and materials. The products are obtained by a process which, among other things, requires only a minor amount of energy.

An embodiment of the invention therefore provides a bitumen-polymer composition, comprising:

a) at least one bitumen; and
b) at least one polymer having hydrocarbon chains with mobile hydrogens or free electrons, said polymer being grafted and crosslinked in situ in said bitumen.

Preferably, the polymer is grafted and crosslinked in situ through a complex of at least one organic silicon compound. The complex is preferably formed from a primary constituent and a secondary constituent. The secondary constituent is preferably the organic silicon compound. The primary constituent preferably grafts the secondary constituent onto the polymer. Accordingly, a further embodiment of the present invention provides:

A bitumen-polymer composition comprising
at least one bitumen;
at least one polymer having hydrocarbon chains with mobile hydrogens or free electrons;
at least one organic silicon compound; and
a compound for grafting the organic silicon compound onto the polymer;
wherein the organic silicon compound is grafted onto the polymer and the polymer crosslinked in situ in the bitumen.

Since the organic silicon and grafting compounds can be a complex, an embodiment of the invention provides a bitumen-polymer composition comprising:

at least one bitumen;
at least one polymer having hydrocarbon chains with mobile hydrogens or free electrons;
and a complex including a primary constituent for grafting an organic compound onto the polymer and a secondary constituent comprising at least one organic silicon compound;
wherein the organic silicon is grafted onto the polymer and the polymer crosslinked in situ in the bitumen.

Yet another embodiment of the invention also comprehends a bitumen-polymer blend comprising at least one bitumen and at least one polymer having hydrocarbon chains with mobile hydrogens or free electrons onto which is grafted an organic silicon compound through a compound for grafting an organic silicon compound onto the polymer, wherein the organic silicon compound is grafted onto the polymer in situ. This blend can be used to form the composition of the invention by in situ crosslinking, e.g., by exposure to water.

The constituents of the composition can also be provided in kit form, for blending by an end user. For instance, the invention may embody a kit for a bitumen-polymer composition comprising: (a) at least one bitumen, (b) at least one polymer having hydrocarbon chains with mobile hydrogens or free electrons, (c) an organic silicon compound and (d) a compound for grafting the organic silicon compound onto the polymer. Constituents (a), (b), (c) and (d) may be separately packaged or, constituents (a) and (b) may be blended and packaged together as one component (i) and constituents (c) and (d) may be blended and packaged together as a second component (ii) such that the kit can comprise: (a), (b), (c) and (d); (i), (c) and (d); (a), (b) and (ii); or (i) and (ii). The kit can further contain instructions for its use. Of course, in the kit (a), (b), (c) and (d) can also be provided admixed, in one package. When (a), (b), (c) and (d) are provided admixed it is preferred that they be packaged under substantially or sufficiently dry conditions so as to prevent the admixture from containing a substantial amount of water, i.e., the package containing (a), (b), (c) and (d) in admixture should be sufficiently free of water, so as to prevent premature crosslinking. And, the package is also preferably hermetically sealed so as to prevent atmospheric moisture from entering into it and causing premature crosslinking.

A still further embodiment of the invention also provides a process for preparing a bitumen-polymer composition, comprising the steps of:

a) making a virtually homogeneous molten blend of at least one bitumen and at least one polymer having hydrocarbon chains with mobile hydrogens or free electrons, said polymer optionally first having been dissolved in a solvent, said step a) including the incorporation into the blend in the molten state, of the primary and secondary constituents that bring about the formation of the complex and give rise to the grafting and crosslinking of the polymer, at least one of said secondary constituents being an organic silicon compound optionally previously dissolved in the polymer solution;

b) keeping the product made in a) in the molten state with agitation for a length of time sufficient to bring about grafting of the complex of the organic silicon compound onto the polymer in the composition made in a);

c) shaping the hot bitumen-polymer compound obtained in b) for the intended use;

d) cooling the shaped compound in the presence of a sufficient amount of water for an adequate length of time to bring about the in situ crosslinking of the grafted polymer by hydrolysis of the silicon complex.

Steps a) and b) of the process are preferably carried out in the absence of water to prevent premature crosslinking.

More generally, the invention embodies a process for preparing a bitumen-polymer blend comprising:

(a) blending in the molten state at least one bitumen and at least one polymer having hydrocarbon chains with mobile hydrogens or free electrons;

(b) adding to the molten blend a grafting agent for grafting an organic silicon compound onto the polymer;

(c) adding to the molten blend an organic silicon compound;

(d) grafting the organic silicon onto the polymer in the molten blend; and (e) crosslinking the polymer in the molten blend.

Steps (b) and (c) may be performed in either order: (b) first, then (c); or (c) first, then (b). Steps (b) and (c) may also be performed simultaneously. Steps (b) and (c) can be performed by adding an admixture or complex of the grafting agent and organic silicon compound. Thus, steps (b) and (c) can also be performed by forming the admixture or complex and then adding it to the molten blend.

Step (d) can be performed by blending, agitating or stirring the product of steps (a), (b) and (c) for a sufficient time to effect the grafting. Step (e) can be performed by allowing the product of steps (a), (b), (c) and (d) to cool for a sufficient time in the presence of sufficient water, e.g., humidity. Thus, the grafting and crosslinking are performed in situ. Additionally, prior to step (e), the product of steps (a), (b), (c) and (d) can be shaped as desired. Steps (a), (b), (c) and (d) are preferably performed in the substantial absence of water or in a substantially or sufficiently dry environment to prevent premature crosslinking. Accordingly, steps (a), (b), (c) and (d) comprise steps for preparing a blend of the invention and, this process for preparing a blend of the invention can further comprise forming a composition of the invention by step (e).

The invention further comprehends products from the bitumen-polymer composition of the invention such as a roofing material comprising the composition or, an anticorrosion coating comprising the composition. Methods for preparing the kits, products and blends of the invention are also within the scope of the invention.

These and other objects and embodiments are disclosed or are obvious from the following detailed description.

DETAILED DESCRIPTION

The bitumen used in the practice of the invention, for instance in the bitumen-polymer composition of the present invention may be a bitumen herein referred to as "natural" bitumen to differentiate it from the "synthetic" bitumen to be described hereinbelow. Natural bitumen can be obtained from crude petroleum, bituminous schists, heavy oils, bituminous sand, and the like or even carbon.

The bitumen can be, for example:

a) the heaviest fraction obtained by straight-run distillation of a crude at atmospheric or reduced pressure;

b) the heavy phase obtained by solvent deasphalting a heavy fraction obtained as in a);

c) the product of oxidation of a heavy fraction as per a) or a heavy phase as per b), obtained in the presence or absence of a catalyst;

d) the product of oxidation, obtained in the presence or absence of a catalyst, of a blend of
—a heavy fraction according to a) or a heavy phase according to b), and
—a distillate, or
—an aromatic extract obtained in the dearomatization of lubricating oils, or
—a deasphalting pitch;

e) a blend of an oxidized product obtained as in b) or c) or of a hard base, and
—a distillate, or
—an aromatic extract obtained in the dearomatization of lubricating oils, or
—a deasphalting pitch, or
—a heavy fraction according to a) or a heavy phase according to b);

f) a visbroken base, alone or blended with one of the aforesaid products.

The bitumen used can also be a "synthetic" bitumen having characteristics similar to those of a "natural" bitumen described hereinabove, for example a synthetic clear binder that can be colored by addition of pigments.

Such materials are, for example, the petroleum resins or indene-coumarone resins blended with aromatic and/or paraffinic hydrocarbons.

The petroleum resins can be prepared by polymerization of unsaturated hydrocarbons present in unsaturated petroleum fractions such as the fractions obtained by thermal or steam cracking or by pyrolysis.

Indene-coumarone resins are obtained from coal tar.

The polymer used in the practice of the present invention is a polymer that has hydrocarbon chains with mobile hydrogens and can be selected from the group consisting of
—polyolefins such as poly-alpha-olefins or $C_{1-12}$ polyolefins, for instance polyethylene, polypropylene, polybutylene, polymers of hexene, polymers of 4-methyl-1-pentene, and the like or olefin copolymers, for instance copolymers or terpolymers of alphaolefins such as $C_1$-$C_{12}$ alpha olefins, for example copolymers of ethylene and hexene, of ethylene and 4-methyl-1-pentene and the like.
—natural or synthetic rubbers, such as
  * EPDM (ethylene-propylene-diene monomer)
  * EPM (ethylene-propylene monomer)
  * random styrene-butadiene copolymers such as SBR (styrene-butadiene rubber) or sequenced styrene-butadiene copolymers such as SBS (styrene-butadiene-styrene), linear or star copolymers, or SIS (styrene-isoprene-styrene),
  * polyisobutylene (butyl rubber)
  * polybutadiene,
  * polyisoprene,
  * polynorbornene,
  * polychloroprene,
—polyvinyl chloride
—ethylene-vinyl acetate copolymers.

The bitumen-polymer composition may contain up to 25 wt. %, preferably 3 to 15 wt. %, of polymer, depending on the nature of the polymer and on the properties desired for the intended use of the composition.

Applicants have successfully used EPDM containing from 45 to 80 wt. % of ethylene units and having a weight-average molecular weight of 100,000 to 500,000 and a diene monomer unit content of 1 to 10 wt. %; the diene monomer being, for example, ethylidenenorbornene, dicyclopentadiene or hexadiene.

To be readily compatible with the polymer, the bitumen composition should have an appropriate proportion of saturated and aromatic hydrocarbons and bituminous resins.

In the bitumen-polymer composition, the polymer is grafted and crosslinked in situ in the bitumen. The polymer is preferably grafted and crosslinked in situ through a complex of at least one organic silicon compound. The complex is preferably formed from a primary constituent and a secondary constituent. The secondary constituent is preferably an organic silicon compound.

Without wishing to be bound by any one particular theory, Applicants believe that in the composition according to the invention the polymer onto which is grafted a complex of at least one organic silicon compound is subsequently crosslinked by hydrolysis of that compound.

The complex itself consists of a primary constituent combined with a secondary constituent, namely the organic silicon compound which in the following description, for merely simplicity (without wishing to necessarily limit the invention), shall be referred to as "silane", although it may contain atoms other than silicon and hydrogen, for example oxygen atoms.

The primary constituent whereby the secondary constituent is grafted onto the polymer is, for example, a sulfur-donating compound or a peroxide. The sulfur compound was found to perform better and is presently preferred.

Applicants have also successfully used dipentamethylenethiuram tetrasulfide. 4,4'-Dithiodimorpholine may also be used.

The silane is chosen on the basis of its molecular weight and boiling temperature. Suitable are, for example, chlorosilanes, for example trichlorosilane; organochlorosilanes, for example vinyltrichlorosilane, methyltrichlorosilane, methyldichlorosilane, dimethyldichlorosilane or methylvinyldichlorosilane; organosilane esters, such as methyltriethoxysilane or methyltrimethoxysilane, vinyltrimethoxysilane, vinyltris-(2-methoxyethoxy) silane or vinyltriacetoxysilane; or methacrylic, epoxy, mercapto and amino derivatives of silane. Among these compounds, vinyltris-(2-methoxyethoxy)-silane is particularly preferred, because its boiling temperature is above 180 ° C.

In fact, a boiling temperature above 180 ° C. for silane is preferred because the first step in the preparation of the bitumen-polymer composition according to the invention can consist of blending the polymer and the bitumen at a temperature between 150° and 230 ° C. The blending can be in a rotor-equipped dynamic mixing chamber for a period of 1 to 3 hrs. Preferably a virtually homogeneous dispersion of the polymer in the bitumen is thereby obtained. The mixing chamber can be a Rayneri turbine.

Before mixing, the polymer can be dissolved in a solvent, such as an aromatic solvent, for example an aromatic extract obtained in the production of lubricant bases. The primary compound (for example the sulfur donor) and the secondary compound (silane) are incorporated simultaneously or successively in either order into the molten bitumen-polymer blend which is then agitated for a sufficient length of time to bring about the grafting of the silane derivative onto the polymer chains through the sulfur compound.

After the addition of the primary and secondary compounds, the resulting hot blend wherein the crosslinking complex is beginning to form has a low viscosity which increases with time.

When the polymer is used in the form of a solution in a solvent, it is advantageous to use this solution for the incorporation of the primary and secondary compounds which as a result are better dispersed and may be used at a lower concentration.

The crosslinking kinetics can be accelerated by incorporating a catalyst, for example a catalyst of the dibutyl tin dilaurate (DBTDL) type.

The blend is shaped as needed for the intended use and placed in contact with water, for example a humid atmosphere. The crosslinking of the grafted polymer then takes place by hydrolysis of the silane and may last several hours to several weeks, depending on the relative humidity and temperature of the environment.

The resulting crosslinked bitumen-polymer composition has a ring-and-ball temperature that can exceed 100° C. and even 180° C. while presenting good elasticity at this temperature and good temperature resistance, particularly good low-temperature pliability equal to or less than −20° C. by the criteria of UEATC (Union Europeenne pour l'Agrement Technique dans la Construction [European Union for Technical Agreement in Construction]).

The bitumen-polymer composition according to the invention is particularly well suited to uses wherein it is exposed to the atmosphere, particularly for making coatings for roofing materials or anticorrosion coatings. These uses of the inventive composition constitute additional embodiments of the present invention.

Naturally, the usual additives for bitumen-polymer compositions, blends, kits and products, such as mineral fillers and the like, may be added to the compositions, blends, kits and products of the invention.

The invention may be further illustrated by the following non-limiting examples, many apparent variations of which are possible without departing from the spirit of the invention.

EXAMPLE 1

This example concerns the preparation of bitumen-polymer composition A according to the invention.

The following materials were used:

1) Bitumen of petroleum origin having the following characteristics:
—penetrability at 25° C. in 1/10 mm (by AFNOR method 66 004): 200,
—softening point in ° C. (by AFNOR method NFT 66 008): 40,
2) EPDM having the following characteristics:

| ethylene | 50 wt % |
|---|---|
| diene | 4 wt % |
| propylene | 46 wt % |
| weight-average molecular weight | 210,000 |

The bitumen (90 wt. %) and EPDM (10 wt. %) were mixed in a Rayneri blender at 190° C. for 2 hrs at the end of which the blend was homogeneous.

At this point, the following system constituting the grafting and crosslinking complex was incorporated:
—silane: vinyltris-(2-methoxyethoxy) silane: 3 wt. % based on the bitumen-polymer blend
—sulfur compound: dipentamethylenethiuram tetrasulfide: 0.5 wt. %, based on the bitumen-polymer blend.

The mixing was continued for 30 min at 190° C.

Composition A thus obtained was made into 2 mm thick plates.

The "ring-and-ball" temperature of the plates was found to be as follows:
—after 7 days in an atmosphere with 50% relative humidity: 75° C.
—after 20 days in an atmosphere with 50% relative humidity: 128° C.
—after 20 days in an atmosphere with 80% relative humidity: 148° C.

This example indicates that the compositions according to the invention have a high "ring-and-ball" temperature and thus possess good heat resistance which makes them suitable for use as coatings for roofing materials.

By comparison, the initial ungrafted, uncrosslinked bitumen-polymer blend has a "ring-and-ball" temperature of only 75° C. which does not increase with time.

EXAMPLE 2

This example concerns the preparation of a composition B according to the invention.

This composition was made by the same method and from the same starting materials as composition A of Example 1. Unlike composition A, however, composition B was made from 85 wt. % of bitumen and 15 wt. % of EPDM.

The "ring-and-ball" temperature of 3 mm thick plates of composition B was determined and found to be as follows:
—after 2 days in an atmosphere with 80% relative humidity: 149° C.
—after 3 days in an atmosphere with 80% relative humidity: 172° C.
—after 43 days in an atmosphere with 80% relative humidity: 200° C.

The low-temperature pliability (LTP) by the UEATC test was −25° C. to −30° C.

It is also noteworthy that the ring-and-ball temperature of composition B increased with time (ring-and-ball temperature of the initial bitumen-polymer blend: 90° C.).

EXAMPLE 3

This example concerns the preparation of a composition C according to the invention.

This composition C was prepared by the same method and from the same starting materials as A and B, but using 95 wt. % of bitumen and 5 wt. % of EPDM.

A study was made of the damping properties of compositions B and C and of a control consisting of a plasticized polyvinyl chloride cement.

The modulus of elasticity (or storage modulus) $E'$ and the viscous modulus (or loss modulus) $E''$ were determined by means of a METRAVIB viscoelasticimeter.

The higher $E''$, the higher is the damping capacity of the product.

TABLE 1

|  | B | C | Control |
|---|---|---|---|
| $E'/E''$ | 0.78 | 0.86 | 0.35 |
| $E'$ | $8.5 \times 10^7$ | $3.53 \times 10^7$ | $1.04 \times 10^7$ |
| $E''$ | $6.69 \times 10^7$ | $3.24 \times 10^7$ | $3.18 \times 10^6$ |

Frequency: 7.8 Hz
Temperature: 10° C.

This table indicates that the compositions according to the invention have damping characteristics.

EXAMPLE 4

A synthetic bitumen consisting of a blend of a petroleum resin and an aromatic extract stemming from the extraction of aromatic hydrocarbons from a lubricating base was used as starting material. The synthetic bitumen had a penetrability at 25° C. of 200 tenths of a millimeter and a ring-and-ball temperature of 45° C.

The synthetic bitumen (90 wt. %) and EPDM used in the preceding examples (10 wt. %) were blended 2 hrs at 180° C. after which the same silane and the same sulfur compound as in Example 1 were added in the same proportions.

2 mm thick plates were made.

In the initial state, the ring-and-ball temperature of the bitumen-polymer blend was 94° C. After 30 days of exposure to an atmosphere with 80% relative humidity, the ring-and-ball temperature was higher than 200° C.

This composition according to the invention thus has an elevated ring-and-ball temperature, as do the compositions of Examples 1 to 3.

Having described in detail preferred embodiments of the present invention, it is to be understood that the invention defined by the appended claims is not to be limited by particular details set forth in the above description as many apparent variations thereof are possible without departing from the spirit or scope of the present invention.

What is claimed is:

1. A bitumen-polymer composition which comprises:
   a) at least one bitumen; and
   b) at least one polymer having hydrocarbon chains with mobile hydrogens or free electrons, said polymer being grafted and crosslinked in situ in said bitumen through a complex including at least one organic silicon compound, said complex being formed from a primary constituent for grafting an organic silicon onto the polymer and a secondary constituent, said secondary constituent being the organic silicon compound and wherein the polymer is EPDM with an ethylene unit content of 45 to 80 wt. %, a weight-average molecular weight of 100,000 to 500,000 and a monomer diene unit content of 1 to 10 wt. %.

2. The composition according to claim 1, wherein it contains a "natural" bitumen.

3. The composition according to claim 1, wherein it contains a "synthetic" bitumen.

4. The composition according to claim 1 wherein it contains up to 25 parts by weight of polymer and 75 parts by weight of bitumen.

5. The composition according to claim 4 wherein it contains 3 to 15 parts by weight of polymer and 97 to 85 parts by weight of bitumen.

6. The composition according to claim 1 wherein the primary constituent is a sulfur donor or a peroxide.

7. The composition according to claim 6 wherein the primary constituent is dipentamethylenethiuram tetrasulfide.

8. The composition according to claim 1 wherein the secondary constituent is a silane selected from the group consisting of chlorosilanes, organosilanes, organosilane esters, a methacrylic derivative of silane, an epoxy derivative of silane, a mercapto derivative of silane and an amino derivative of silane.

9. The composition according to claim 8 wherein the silane is selected from the group consisting of trichlorosilane, vinyltrichlorosilane, methyltrichlorosilane, methyldichlorosilane, dimethyldichlorosilane, methylvinyldichlorosilane, methyltriethoxysilane, methyltrimethoxysilane, vinyltrimethoxysilane, vinyltris-(2-methoxyethoxy) silane and vinyltriacetoxysilane.

10. The composition according to claim 9, wherein that the silane is vinyltris-(2-methoxyethoxy)silane.

11. A process for preparing a bitumen-polymer composition which comprises the following steps:
   a) making a virtually homogeneous molten mixture of at least one bitumen and at least one polymer having hydrocarbon chains with mobile hydrogens or free electrons, said polymer optionally first having been dissolved in a solvent; this step a) including blending into the mixture in the molten state, a primary constituent for grafting an organic silicon compound onto the polymer and a secondary constituent comprising at least one organic silicon compound, said secondary constituent being optionally previously dissolved in the polymer solution,
   b) maintaining the product obtained in a) in the molten state, with agitation, for a sufficient length of time to bring about grafting of the organic silicon compound onto the polymer,
   c) shaping the hot bitumen-polymer compound obtained in b) for the intended use,
   d) cooling said shaped compound in contact with a sufficient amount of water and for an adequate length of time to bring about the in situ crosslinking of the grafted polymer by hydrolysis of the silicon complex.

12. The process according to claim 11, wherein the making of the mixture and the blending of the mixture is carried out at a temperature of 150° to 230° C.

13. A bitumen-polymer composition comprising
   at least one bitumen;
   at least one polymer having hydrocarbon chains with mobile hydrogens or free electrons;
   at least one organic silicon compound; and
   a compound for grafting the organic silicon compound onto the polymer;
   wherein the organic silicon compound is grafted onto the polymer and the polymer crosslinked in situ in the bitumen.

14. A bitumen-polymer blend comprising at least one bitumen and at least one polymer having hydrocarbon chains with mobile hydrogen or free electrons onto which is grafted an organic silicon compound through a compound for grafting an organic silicon compound onto the polymer, wherein the organic silicon compound is grafted onto the polymer in situ.

15. A kit for preparing a bitumen-polymer blend or composition comprising: (a) at least one bitumen; (b) at least one polymer having hydrocarbon chains with mobile hydrogens or free electrons, (c) an organic silicon compound and (d) a compound for grafting the organic silicon compound onto the polymer, wherein constituents (a), (b), (c) and (d) are separately packaged; or constituents (a) and (b) are blended and packaged together as one component (i) and constituents (c) and (d) are blended and packaged together as a second component (ii) such that the kit can comprise (i), (c) and (d); (a), (b) and (ii); or (i) and (ii); or constituents (a), (b), (c) and (d) are blended and packaged together as one component; and wherein the polymer is EPDM with an ethylene unit content of 45 to 80 wt. %, a weight-average molecular weight of 100,000 to 500,000 and a monomer diene unit content of 1 to 10 wt. %.

16. A process for preparing a bitumen-polymer blend comprising:
   (a) blending in the molten state at least one bitumen and at least one polymer having hydrocarbon chains with mobile hydrogens or free electrons;
   (b) adding to the molten blend a grafting agent for grafting an organic silicon compound onto the polymer;
   (c) adding to the molten blend an organic silicon compound; and (d) grafting the organic silicon onto the polymer in the molten blend.

17. The process of claim 16 further comprising preparing a bitumen-polymer composition comprising:
(e) crosslinking the polymer in the molten blend.

18. The process of claim 17 wherein step (c) is performed before step (b).

19. A roofing material comprising a bitumen-polymer composition as claimed in claim 1.

20. An anticorrosion coating material comprising a bitumen-polymer composition as claimed in claim 1.

21. A bitumen-polymer composition comprising:
at least one bitumen;
at least one polymer having hydrocarbon chains with mobile hydrogens or free electrons; and
a complex including a primary constituent for grafting an organic compound onto the polymer and a secondary constituent comprising at least one organic silicon compound;
wherein the organic silicon is grafted onto the polymer and the polymer crosslinked in situ in the bitumen.

22. A bitumen-polymer composition which comprises:
a) at least one bitumen; and
b) at least one polymer having hydrocarbon chains with mobile hydrogens or free electrons, said polymer being grafted and crosslinked in situ in said bitumen through a complex including at least one organic silicon compound, said complex being formed from a primary constituent for grafting an organic silicon onto the polymer and a secondary constituent, said secondary constituent being the organic silicon compound and wherein the primary constituent is dipentamethylenethiuram tetrasulfide.

23. The composition according to claim 22, wherein it contains a "natural" bitumen.

24. The composition according to claim 22, wherein it contains a "synthetic" bitumen.

25. The composition according to claim 22 wherein the polymer is selected from the group consisting of:
a) a polyolefin selected from the group consisting of polyethylene, polypropylene and olefin copolymers;
b) a natural or synthetic rubber selected from the group consisting of:
 * EPDM (ethylene-propylene-diene monomer),
 * EPM (ethylene-propylene monomer),
 * random styrene-butadiene copolymers including SBR (styrene-butadiene rubber), sequenced styrene-butadiene copolymers selected from the group consisting of SBS (styrene-butadiene-styrene), linear or star copolymers, and SIS (styrene-isoprene-styrene),
 * polyisobutylene (butyl rubber),
 * polybutadiene,
 * polyisoprene,
 * polynorornene, and
 * polychloroprene;
c) polyvinyl chloride; and
d) ethylene-vinylacetute copolymers 26. The composition according to claim 22 wherein it contains up to 25 parts by weight of polymer and 75 parts by weight of bitumen.

27. The composition according to claim 26 wherein it contains 3 to 15 parts by weight of polymer and 97 to 85 parts by weight of bitumen.

28. The composition according to claim 22 wherein the secondary constituent is a silane selected from the group consisting of chlorosilanes, organosilanes, organosilane esters, a methacrylic derivative of silane, an epoxy derivative of silane, a mercapto derivative of silane and an amino derivative of silane.

29. The composition according to claim 28 wherein the silane is selected from the group consisting of trichlorosilane, vinyltrichlorosilane, methyltrichlorosilane, methyldichlorosilane, dimethyldichlorosilane, methylvinyldichlorosilane, methyltriethoxysilane, methyltrimethoxysilane, vinyltrimethoxysilane, vinyltris-(2-methoxyethoxy) silane and vinyltriacetoxysilane.

30. The composition according to claim 29, wherein that the silane is vinyltris-(2-methoxyethoxy)silane.

31. The composition according to claim 22 wherein the polymer is EPDM with an ethylene unit content of 45 to 80 wt. %,
a weight-average molecular weight of 100,000 to 500,000 and a monomer diene unit content of 1 to 10 wt. %.

32. A roofing material comprising a bitumen-polymer composition as claimed in claim 22.

33. An anticorrosion coating material comprising a bitumen-polymer composition as claimed in claim 22.

34. A kit for preparing a bitumen-polymer blend or composition comprising: (a) at least one bitumen; (b) at least one polymer having hydrocarbon chains with mobile hydrogens or free electrons, (c) an organic silicon compound and (d) a compound for grafting the organic silicon compound onto the polymer, wherein constituents (a), (b), (c) and (d) are separately packaged; or constituents (a) and (b) are blended and packaged together as one component (i) and constituents (c) and (d) are blended and packaged together as a second component (ii) such that the kit can comprise (i), (c) and (d); (a), (b) and (ii); or (i) and (ii); or constituents (a), (b), (c) and (d) are blended and packaged together as one component; and, wherein the compound for grafting the organic silicon compound onto the polymer is dipentamethylenethiurom tetrasulfide.

35. The process of claim 17 wherein steps (b) and (c) are performed simultaneously.

36. The process of claim 17 wherein steps (b) and (c) are performed by adding an admixture or complex of the grafting agent and organic silicon compound.

37. A bitumen-polymer composition which comprises:
a) at least one bitumen; and
b) at least one polymer having hydrocarbon chains with mobile hydrogens or free electrons, said polymer being grafted and crosslinked in situ in said bitumen through a complex including at least one organic silicon compound, said complex being formed from a primary constituent for grafting an organic silicon onto the polymer and a secondary constituent, said secondary constituent being the organic silicon compound.

38. The composition according to claim 37 wherein the polymer is selected from the group consisting of:
a) a polyolefin selected from the group consisting of polyethylene, polypropylene and olefin copolymers;
b) a natural or synthetic rubber selected from the group consisting of:
 * EPDM (ethylene-propylene-diene monomer),
 * EPM (ethylene-propylene monomer),

* random styrene-butadiene copolymers including SBR (styrene-butadiene rubber), sequenced styrene-butadiene copolymers selected from the group consisting of SBS (styrene-butadiene-styrene), linear or star copolymers, and SIS (styrene-isoprene-styrene),
* polyisobutylene (butyl rubber),
* polybutadiene,
* polyisoprene,
* polynorbornene, and
* polychloroprene;

c) polyvinyl chloride; and
d) ethylene-vinyl acetate copolymers.

39. The composition according to claim 37 wherein it contains up to 25 parts by weight of polymer and 75 parts by weight of bitumen.

40. The composition according to claim 39 wherein it contains 3 to 15 parts by weight of polymer and 97 to 85 parts by weight of bitumen.

41. The composition according to claim 37 wherein the primary constituent is a sulfur donor or a peroxide.

42. The composition according to claim 37 wherein the secondary constituent is a silane selected from the group consisting of chlorosilanes, organosilanes, organosilane esters, a methacrylic derivative of silane, an epoxy derivative of silane, a mercapto derivative of silane and an amino derivative of silane.

43. The composition according to claim 42 wherein the silane is selected from the group consisting of trichlorosilane, vinyltrichlorosilane, methyltrichlorosilane, methyldichlorosilane, dimethyldichlorosilane, methylvinyldichlorosilane, methyltriethoxysilane, methyltrimethoxysilane, vinyltrimethoxysilane, vinyltris-(2-methoxyethoxy)silane and vinyltriacetoxysilane.

44. The composition according to claim 43, wherein that the silane is vinyltris-(2-methoxyethoxy)silane.

45. A roofing material comprising a bitumen-polymer composition as claimed in claim 37.

46. An anticorrosion coating material comprising a bitumen-polymer composition as claimed in claim 37.

47. The composition of claim 37 having a ring and ball temperature greater than 100° C.

48. The composition of claim 47 having low temperature pliability equal to or less than −20° C. by UEATC criteria.

* * * * *